Aug. 6, 1963 R. C. BOLESKY 3,099,844
SEAT CONSTRUCTIONS AND PROCESSES OF PRODUCING THE SAME
Filed Jan. 4, 1961 3 Sheets-Sheet 3
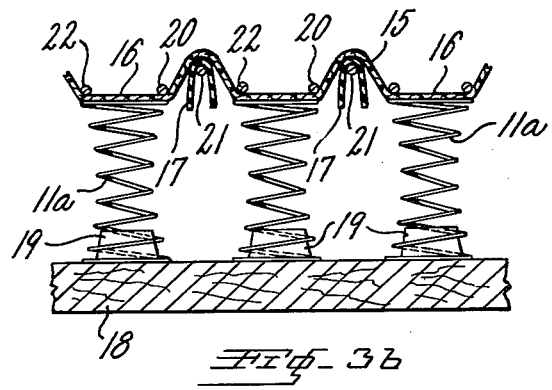
_Fig. 3b_
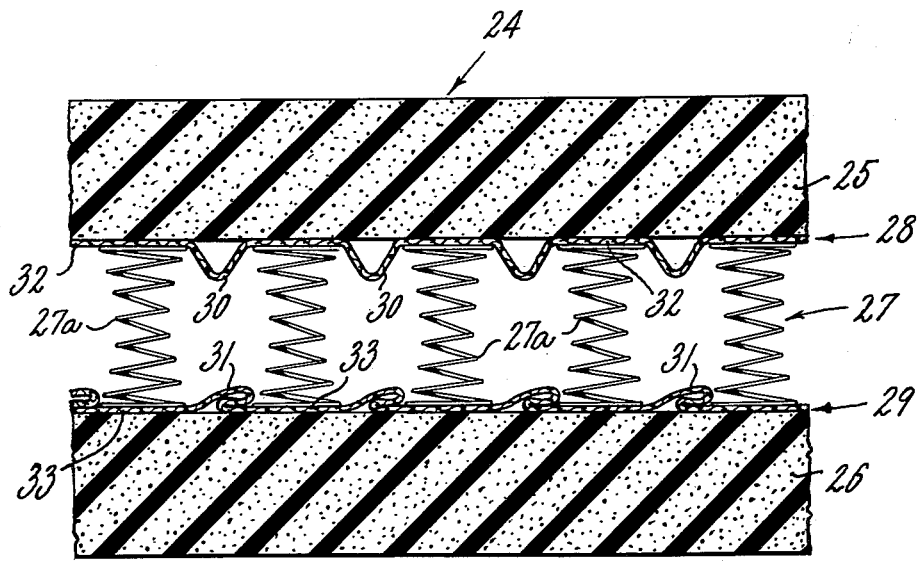
_Fig. 5_
INVENTOR.
RICHARD C. BOLESKY
BY
Robert J. Patterson
ATTORNEY United States Patent Office 3,099,844
Patented Aug. 6, 1963

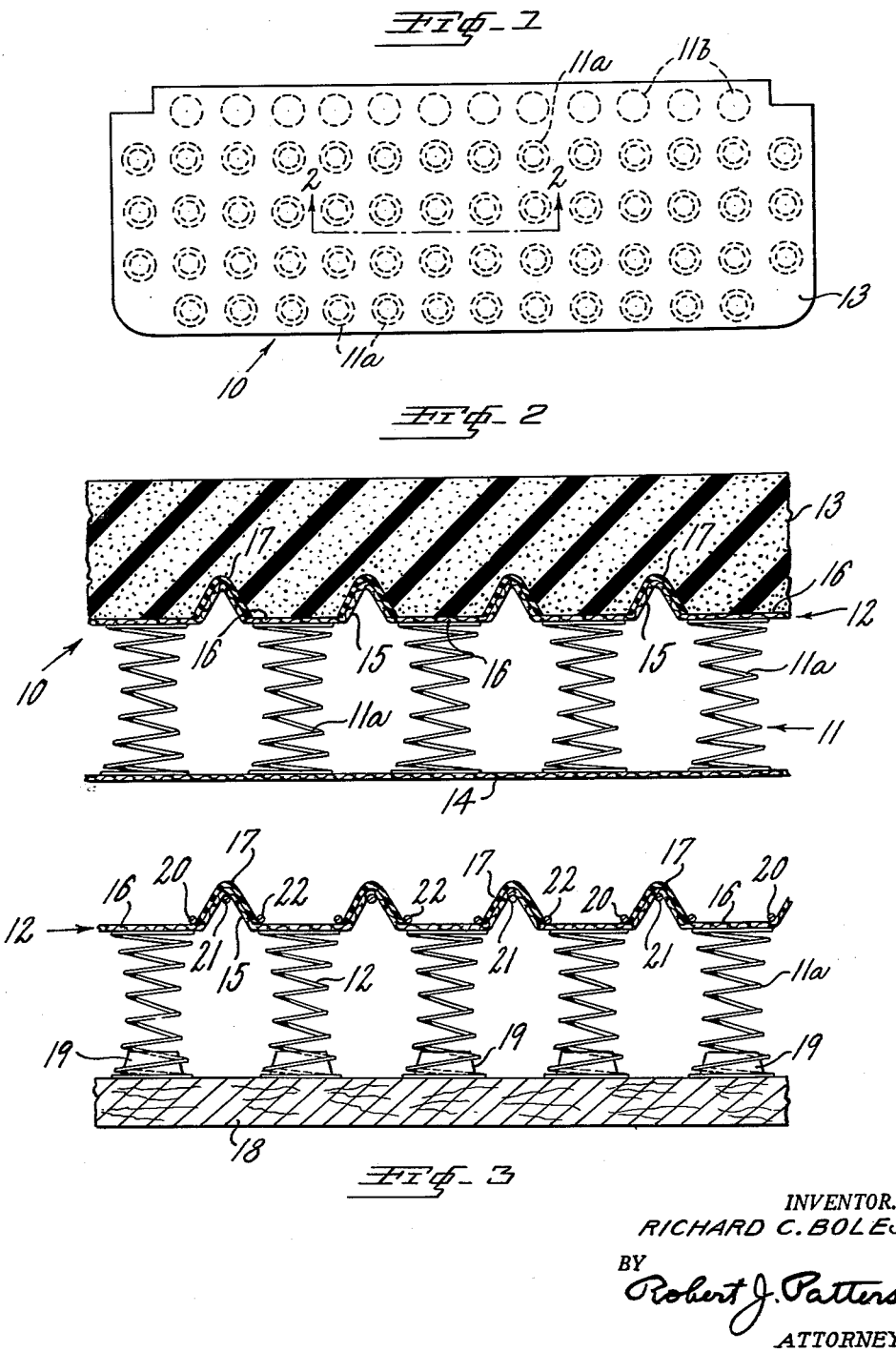

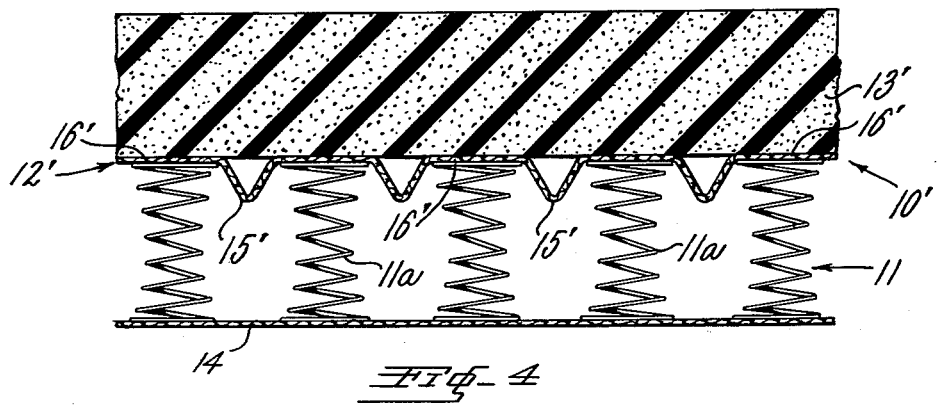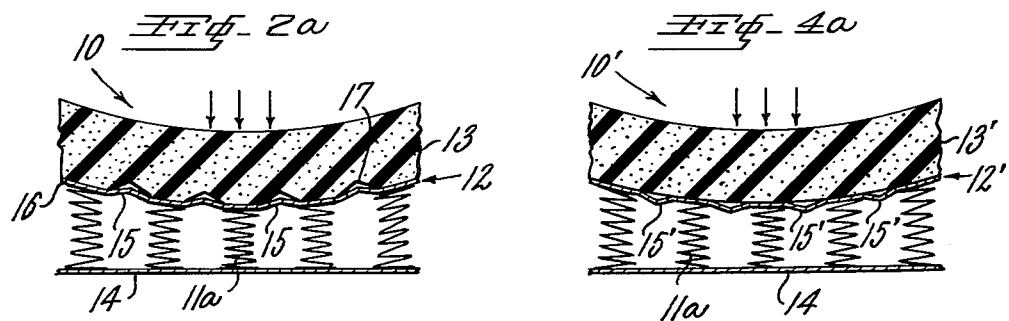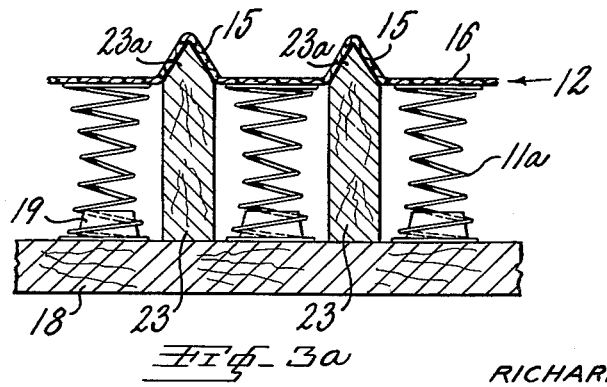

3,099,844
SEAT CONSTRUCTIONS AND PROCESSES OF
PRODUCING THE SAME
Richard C. Bolesky, South Bend, Ind., assignor to United
States Rubber Company, New York, N.Y., a corporation of New Jersey
Filed Jan. 4, 1961, Ser. No. 80,594
9 Claims. (Cl. 5—354)

This invention relates to the manufacture of spring-base or spring-filled seat cushions, mattresses, upholstered furniture seats, and like seat constructions, as well as to novel processes of making the same.

Automobile seat cushions, for example, presently on the market are generally made by mounting a resilient pad or like body of foam or sponge rubber on a matrix of helical compression springs. The top ends of the springs are usually separated from the adjacent bottom surface of the rubber pad by means of a sheet of an inextensible fabric, such as burlap, commonly known as an "insulator." The springs are also usually interconnected with one another by this sheet of burlap or by separate linking elements such as wires.

One of the major deficiencies of these known automobile seats is the tendency for the cushions to give a "hammock effect" when occupied. Stated in other words, this means that when a person sits on such a seat, the springs located at the region of the major load application are compressed, while the surrounding springs located at respectively greater and greater distances from the point of application of the load are deflected and pulled angularly out of their initial vertical positions over toward this point by virtue of the relatively unyielding interconnections of the springs with another. Thus the "hammock effect," which results from the use of the burlap sheet and/or the linking wires, has a tendency to constrict the seat by pulling the opposite sides thereof up relatively to the downwardly depressed or loaded region of the seat.

Similar effects have been noted in other seat constructions, such as mattresses, box springs, seats for upholstered furniture, and the like. It will be understood that in the case of a foam rubber mattress, the "hammock effect" is experienced regardless of which side of the latter is up in view of the fact that such a mattress, by way of distinction from a chair seat or automobile seat cushion in which the spring system rests on a rigid base, ordinarily has two pads of foam rubber positioned across the opposite faces of the spring system and separated therefrom by two inextensible insulator sheets.

Manufacturers of mattresses and upholstered furniture have been cognizant of the "hammock effect," as well as of its disadvantages and undesirable features, and have made attempts to eliminate the effect in such articles by wrapping the springs individually in fabric casings so that there is no connection between the respective adjacent springs. This type of spring arrangement is commonly known as the "Marshall" type of construction, and its principal advantage is that when the so-constructed seat or mattress is occupied, it is depressed only in the occupied area and not pulled inwardly at the opposite sides thereof, due to the fact that any spring more or less remote from the point of load application will not be deflected sideways, i.e., out of its vertical position, although it may be more compressed on the side thereof facing toward the load than on the side facing away from the load. Articles of these classes which embody a "Marshall" spring construction are generally considered to be of a very high grade and are correspondingly expensive.

It has heretofore also been proposed to manufacture automobile seat cushions with spring arrangements of the "Marshall" type. To-date, however, this proposal has not been generally adopted, and construction of such seat cushions has not been undertaken on a large scale by any automobile manufacturer, for the sole reason that the cost of automotive seating products characterized by 'Marshall" spring arrangements would be prohibitive.

It is, therefore, an important object of the present invention to provide novel constructions for automotive seat cushions, furniture seats, mattresses and like articles, as well as novel processes of manufacturing such articles, so that the same have the advantages of "Marshall" type seat constructions and are inexpensive to produce as well as free of the disadvantages inherent in other types of known seat constructions.

Another object of the present invention is the provision of seat constructions as aforesaid in which a burlap sheet insulator having a special formation is interposed between the foam rubber seating pad and the spring system so as to leave all of the springs independent of one another despite their common connection to the burlap sheet.

It is also an object of the present invention to provide seat constructions of the aforesaid type and processes of producing the same in which the foam rubber seating pad may either be poured and cured in situ on the shaped burlap sheet or molded separately as a slab and so adhered to the said sheet.

Generally speaking, the present invention contemplates the provision of seat constructions which are characterized by the combination of a body-supporting or seating pad composed of synthetic or natural foam or sponge rubber or plastic, and a system of rows of coil springs extending substantially vertically relative to the plane of the said pad for supporting the same, with a sheet or layer of burlap or like fabric insulator which is positioned between the spring system and the seating pad and is provided with a plurality of pleats extending parallel to and located intermediate the rows of springs to effectively render the normally inextensible insulator extensible under applied loads.

The springs employed are preferably of the type known as hourglass springs which have been found to have the best compression strength characteristics and to yield optimum seating and resting comfort. The bottom ends of the springs in the case of a furniture or automobile seat may be secured to a second sheet of fabric, such as burlap, which is not pleated and is adapted to be secured to the seat frame base, or alternatively the springs may be secured directly to a rigid baseboard constituting a part of the seat frame. In the case of a mattress, where two seating pads are employed, pleated insulators may be secured to both faces of the spring system between the latter and the respective seating pads.

The actual seating pads are constructed of natural or synthetic rubber or like resilient material, and preferably of foam rubber. In accordance with one aspect of the present invention, the pads are made of a chemically or air blown foam, e.g. urethane, vinyl or latex, which is poured, molded and cured in situ. According to another aspect of the present invention, the pads are made of preformed and cured slabs or sheets of such a foam which can be placed bodily onto the pleated insulators and then adhered to the same and to the associated spring systems by any suitable rubber adhesive.

The foregoing and other objects, characteristics and advantages of the present invention will be more fully understood from the following detailed description thereof when read in conjunction with the accompanying drawings, in which:

FIG. 1 is a top plan view of an automobile seat cushion constructed in accordance with the principles of the present invention;

FIG. 2 is a sectional view taken along the line 2—2 in FIG. 1 and illustrates the inner construction of the seat cushion according to one embodiment of the present invention;

FIG. 2a is a diagrammatic illustration of the seat cushion construction shown in FIG. 2 when subjected to a load;

FIG. 3 is a schematic illustration of one manner of forming the pleated insulator as a part of the process of producing the seat cushion of FIG. 2 and shows some of the elements of the apparatus employed in carrying out this process;

FIG. 3a is a schematic illustration of another manner of forming the pleated insulator as a part of the process of producing the seat cushion of FIG. 2 and shows certain alternative elements of the apparatus employed in carrying out this process;

FIG. 3b is a schematic illustration of a modified version of the production of a seat cushion differing slightly from that shown in FIG. 2 with the aid of the apparatus shown in FIG. 3;

FIG. 4 is a sectional view taken along the line 2—2 in FIG. 1 and illustrates the inner construction of the seat cushion according to another embodiment of the present invention;

FIG. 4a is a diagrammatic illustration of the seat cushion of FIG. 4 under an applied load; and FIG. 5 is a sectional view similar to FIGS. 2 and 4 and illustrates the inner construction of a mattress according to the present invention.

Referring now more particularly to FIGS. 1 and 2, an automobile seat cushion 10 constructed in accordance with the present invention comprises a spring system 11, a fabric insulator 12 positioned across the top of the spring system, a rubber seating pad 13 disposed over the insulator, and a fabric base sheet 14 for the spring system 11. The frame of the automobile seat designed to accommodate the cushion 10, as well as the usual outer fabric cover which encloses the cushion, are not explicitly illustrated, as the provision and constructions thereof are matters of common practice and constitute no part of the present invention. It will be understood, of course, that the structure shown in FIG. 1, although specifically described as an automobile seat cushion, may be a furniture seat structure such as a club chair, couch, and the like, or a mattress-supporting box spring, or any spring-base seating structure the spring system of which is intended to be mounted on and supported by a rigid frame or base.

The spring system 11 essentially comprises a plurality of helical coil springs 11a and 11b made of steel wire or the like and arranged in a substantially regular pattern of straight rows extending both from front to rear and from side to side of the seat cushion 10 (see FIG. 1). In the arrangement illustrated, two different types of springs are employed, the springs 11a, as schematically indicated in FIG. 1 and explicitly shown in FIG. 2, being of the hourglass type, i.e. wider at their opposite ends than at their centers, and the springs 11b, as schematically indicated in FIG. 1, being of substantially uniform diameter over their entire working lengths. In addition, for purposes of optimum seating comfort, those of the springs 11a which are located in the peripheral rows of the spring system, i.e. at the front and sides of the seat cushion, are preferably made of wire having somewhat greater diameter and greater compressive strength than the springs 11a which are located in the central region of the cushion, while the springs 11b are preferably made of wire having a diameter intermediate those of the two types of springs 11a. Merely by way of example, the front and side springs 11a are made of 16 gauge steel wire having a diameter of 0.0625 inch, and the center springs 11a of 18 gauge steel wire having a diameter of 0.047 inch, while the rear springs 11b are made of 17 gauge steel wire having a diameter of 0.054 inch. All the springs are 3¾ inches long and terminate at their opposite ends in a plurality of flat or coplanar turns of greater diameter than any of the working turns, the center springs 11a having 11½ turns with 6½ working turns, the front and side springs 11a having 11 turns with 6½ working turns, and the rear springs 11b having 12 turns with 7½ working turns.

It is to be understood, of course, that the spring shapes, sizes and strengths chosen for any given seat cushion may differ from the illustrative values set forth herein, depending on the qualities of seating comfort and load resistance desired, on the intended cost of the seat cushion, and on other related factors. Thus, the springs 11b may also be of the hourglass type, or the springs 11a may be of the uniform turn diameter type, and their relative strengths need not necessarily be as described.

The insulator 12 positioned across the top of the spring system 11 is composed of a sheet of burlap or like fabric. The burlap of which the sheet 12 is made is, by way of example, a 7½ ounce material having a ¼ inch mesh of a type commercially readily available. The specific type of material employed, however, and its characteristics are of no critical importance in the implementation of the present invention except for the openness of the mesh which must be sufficient to permit a controlled amount of strike-through or passage of fluid foam through the sheet for a purpose to be more particularly referred to presently.

As clearly shown in FIG. 2, in accordance with one embodiment of the present invention, the burlap sheet 12 is provided with a plurality of substantially V-shaped pleats 15 extending parallel to one another from the front to the rear of the seat cushion and upwardly relative to the plane of the sheet 12. Each pleat is located between two adjacent rows of the springs 11a—11b, and each pair of adjacent pleats is separated by a flat region 16 of the sheet 12. Disposed over the latter is the foam rubber seating pad 13 which, according to this embodiment of the invention, is composed of a chemically or air blown foam which is poured directly onto the pleated burlap sheet and cured in situ, as will be more fully explained hereinafter. Due to the porosity or open mesh structure of the burlap sheet 12, some of the fluid foam, upon being poured onto the insulator sheet 12, penetrated through the plane sections 16 of the sheet and came into contact with the uppermost flat end turns of the springs 11a and 11b. These end turns of the springs thus became embedded in the foam and bonded thereto when the latter became fully cured. The springs 11a and 11b are, therefore, firmly secured to the burlap sheet sections 16 and to the foam rubber seating pad without penetrating or cutting into the latter.

The aforesaid penetration of the foam through the burlap sheet at the locations where the flat sheet sections 16 contact the uppermost ends of the springs is an essential element of this form of the invention. As will become more clearly apparent presently, however, penetration of foam through the pleats 15 of the burlap insulator sheet 12 so as to fill the gaps or channels below the same is undesirable and cannot be tolerated, for reasons which will also be more fully explained presently. To this end, there is superposed onto each of these pleats prior to the pouring of the foam a layer 17 of any suitable foam-impervious material. Most preferably, the layers 17 are constituted by narrow strips of polyethylene, but it is to be understood that other materials such as Saran, vinyl sheeting, impregnated or otherwise treated foam-impermeable papers and the like could be employed in lieu of polyethylene.

As hereinbefore indicated, the seating pad 13 may be made of any suitable type of foam. Most preferably, however, it is made of a material which is capable of curing in situ as poured and does not require any after-treatment such as heating to effect the curing thereof. A foam which has been found highly suitable from this standpoint is chemically blown urethane foam which is particularly advantageous due to its high tensile strength and tough skin. Other foams which serve the purposes of the present invention are chemically blown or air-frothed latex foam, either synthetic or natural or a combination thereof, and chemically blown or air-frothed vinyl foam, but as will be appreciated by those skilled in the art these types of foams are not self-curing, as is the polyurethane foam, and must be passed through a heating zone after being poured into the mold in order to become fully cured.

FIG. 3 illustrates one form of the process according to the present invention by means of which the seat cushion construction of FIG. 2 is attained. The springs 11a and 11b are initially placed onto a baseboard 18 which constitutes the bottom of a mold (not shown) having the size, shape and contours of the desired seat cushion. Atop the baseboard 18 are provided locating pegs 19 which extend upwardly from the baseboard in a plurality of perpendicular rows and support the various coil springs 11a and 11b in a vertical position. The entire mold is of conventional construction and its parts may be made of any suitable material such as steel, wood, heavy cardboard, or the like, although wood is preferred due to its relative cheapness and great durability. In any case, of course, the interior surfaces of that part of the mold which provides the confined space into which the foam is poured, must be coated with a suitable mold releasing composition to prevent adhesion of the cured seating pad to these surfaces. Typical materials which may be employed for this purpose are dispersions of natural and/or synthetic waxes in organic solvents, preferably mixtures of natural waxes with petroleum-based synthetic waxes of the micro-crystalline type in such proportions that the resultant compositions have melting points between about 150° F. and about 200° F., such as American Latex Mold Release #3, Shanco 32-6 Wax Dispersion, and Brulins Permamold 3-27.

With the springs 11a and 11b in position on the baseboard 18, the insulator sheet 12 is placed onto and across the uppermost flat ends of the springs, and the pleats 15 are formed in the sheet 12 by respective sets of parallel wires or rods 20—21—22 extending across the mold frame, with the wires 20 and 22 being located above the plane of the sheet 12 and the wires 21 below the sheet but above the plane of the wires 20 and 22. The wires or rods of each set are arranged at the corners of a triangle of any predetermined shape disposed intermediate two adjacent rows of springs, and thus the pairs of wires or rods 20 and 22 define the respective opposite lateral edges of the pleats while the wires or rods 21 define the apices of the pleats. It will be understood that the formation of the pleats may be achieved by passing the sheet 12 about the various wires as it is laid onto the springs 11a and 11b, or by placing the wires in position after the sheet is placed onto the springs. As desired, the strips 17 of polyethylene or other foam-impermeable material may be applied to the insulator sheet prior to the formation of the pleats 15 therein, or they may be placed onto the upper surfaces of the pleats after the latter have been formed in the mold. The strips 17 may be stapled, stitched or adhesively secured to the respective pleats 15, but they may just as well be only loosely laid thereonto, since their sole purpose is to prevent the filling of the entire channels defined by the pleats with cured foam, for a reason which will be more fully explained presently.

The foam which is ultimately to constitute the seating pad 13 is now poured into the mold and directly onto the pleated sheet 12. The type of foam employed may be selected at will and does not per se constitute a part of the present invention. As previously indicated, the foam is preferably a chemically blown urethane foam, although other types such as latex or vinyl foams may also be employed.

Merely for purposes of illustration, a urethane foam designed for use in the process of producing a seat cushion according to the present invention may be formed as follows. A polymer having reactive isocyanate groups is made by reacting toluene diisocyanate (80% 2,4 and 20% 2,6 isomer mixture) with a polyol prepared by condensing propylene oxide onto trimethyl propane to an approximate molecular weight of 4,000. The toluene diisocyanate is reacted with the polyol at an equivalent ratio of 5.3 equivalents of toluene diisocyanate per equivalent of polyol. This diisocyanate-polyol reaction product, which may be referred to as the prepolymer, is stabilized for foaming by the addition of 4 parts of a suitable silicone oil, e.g. an organic modified polysiloxane produced by Union Carbide Corporation under the designation L-520, per 100 parts of polyol. After stabilization, the prepolymer is foamed by adding to 100 parts thereof 5 parts of trichloromonofluoromethane, 5 parts of toluene diisocyanate, and 5 parts of didecylphthalate. This master batch is fed as a separate stream into a mixing head where it is mixed with a catalyst-water mixture comprising 0.5 part triethylamine, 1.0 part stannous octoate, 1.0 part N-ethylmorpholine, and 2.8 parts water. The resultant foaming mixture is that which is poured into the mold.

A typical frothed latex foam which may be employed in practicing the present invention may be obtained by suitably combining 80 parts by weight of a styrene-butadiene latex and 20 parts of a natural rubber latex with 2 parts sulfur, 0.90 part ethyl zimate, 1.1 part zinc salt of 2-mercaptobenzothiazole, 3 parts zinc diethyl dithiocarbamate, 0.75 part amine stabilizer, 0.75 part antioxidant, and 25 parts talc, and stirring as required. It is to be understood, of course, that this composition is merely representative of a large class of latex foams the compounding of which is well known to those skilled in the art and requires no further detailed explanation herein.

Similarly, vinyl foams and their preparation are well known to the art. Such foams are essentially composed of suitably frothed mixtures of a vinyl resin and a plasticizer therefor together with one or more of a number of secondary ingredients, such as surface-active agents and the like. Merely by way of example, such vinyl foams as are disclosed in U.S. Patent No. 2,666,036 of E. H. Schwencke and in U.S. Patent No. 2,861,963 of P. V. Butsch are suitable for use in making seating pads for seat cushions and other seat constructions in accordance with the present invention.

Reverting now to the actual cushion-forming process, as the fluid foam rests on the flat portions 16 of the insulator sheet 12, some of it seeps through the interstices or mesh openings in the sheet and comes into contact with the uppermost flat end turns of the springs 11a and 11b. Thus, these end turns of the springs become surrounded by the foam and, when the latter has become fully solidified and cured, are embedded therein and securely bonded to the sheet 12 and to the foam rubber pad 13. It will be apparent that in the case of a polyurethane foam it is merely necessary to permit the same to remain in the mold until it is cured, which occurs at room temperature and without any need for subsequent heat treatment. In the case of a vinyl or latex foam of the types set forth hereinbefore, however, the entire mold must be passed through a heating zone in which the temperature of the foam can be elevated to any predetermined level to effect the curing thereof in a manner well known to those skilled in the art. Other than at the areas of contact between the flat portions 16 of the sheet 12 and the top ends of the springs, of course, no substantial seepage of the fluid foam beyond the bottom surface of the sheet should occur. That, as will be readily appreciated, would permit the foam to fill and solidify in the V-shaped channels defined below the pleats 15, which would defeat the purpose of the provision of these pleats in the first place. The foam-impermeable layers or strips 17 effectively prevent any such undesired seepage or strike-through of foam at the pleats 15. Prior to the completion of the curing process, of course, the pleat-forming wires 20, 21 and 22 are extracted from the mold. Where the strips are not secured to the insulator sheet 12 at the pleats 15, this will permit the latter to drop and hang down into the spaces between the rows of springs, but no detriment to the seat cushion is incurred by such an eventuality since an object of the present invention is to render the normally inextensible insulator stretchable, which is achieved irrespective of whether the pleats extend up or down relation to the normal plane of the insulator sheet.

As soon as the foam rubber pad 13 is fully cured, the entire assembly is removed from the baseboard 18 and the locating pegs 19, and the free bottom ends of the springs 11a and 11b are attached to the base sheet 14 of burlap in any suitable manner, as by means of an adhesive or glue composition, and this assembly, which is illustrated in FIG. 2, is then placed onto the base of the vehicle seat frame. Alternatively, if it is desired to dispense with the base sheet 14, the bottom ends of the springs may be placed on and attached directly to the base of the seat frame. It is also possible, in accordance with the present invention, to attach the springs to the seat frame base prior to the foam pouring operation. In such a case, the use of the baseboard 18 and locating pegs 19 can also be dispensed with, the seat frame base and attached spring system 11 being placed into a mold where the pleated insulator sheet-laying and foam-pouring operations are carried out as hereinbefore described.

A somewhat modified process of forming the pleats 15 in the insulator 12 is illustrated schematically in FIG. 3a. As there shown, the springs 11a and 11b are again positioned on respective locating pegs 19 mounted on the baseboard 18 in the same manner as shown in FIG. 3. The sheet 12 of burlap or like fabric is positioned across the top of the so-formed spring system. In lieu of employing a plurality of transverse wires or rods for the purpose of defining the respective pleats in the sheet 12, however, the process illustrated by FIG. 3a is characterized by the use of a plurality of wooden blocks 23 which are positioned on the baseboard and extend upwardly therefrom between the rows of locating pegs and springs positioned thereon. The top edge portion 23a of each of the blocks 23 is substantially triangular in cross-section and thus has the shape of the desired pleat, and the said top edge portions of the blocks are disposed above the top plane of the spring system. It will, therefore, be apparent that when the insulator sheet 12 is laid onto the springs 11a and 11b as shown, the pleats 15 will be formed therein by the upper edge portions 23a of the wooden blocks 23.

As soon as this has been done, the foam may be poured onto the insulator sheet 12 in the same manner as described hereinbefore with respect to FIGS. 2 and 3. It will be noted from FIG. 3a that for this embodiment of the process of this invention no strips of polyethylene or other foam-impermeable material are shown as covering the top surfaces of the pleats 15 in the manner of FIG. 3. This omission of the strips 17 is rendered possible by virtue of the fact that even though the fluid foam may penetrate into the mesh openings of the insulator 12 at the pleats 15 thereof, such penetration is limited to the extent of the thickness of the sheet itself by virtue of the contact between the lower surfaces of the pleats and the upper surfaces of the pleat-forming blocks 23, so that the foam is still prevented from entering and solidifying in the V-shaped spaces defined below the pleats. At the worst, a small amount of the foam may even pass through the insulator fabric at the pleats, but the presence of the blocks 23 prevents this from forming a solid cured mass filling the pleat channels. The extensibility of the insulator will, however, not be affected. In such cases, of course, the upper edge portions of the pleat forming blocks must be coated with a suitable releasing wax or like adhesion-inhibiting substance, of the types mentioned hereinbefore in connection with the mold, to prevent adhesion of the cured foam to the block surfaces. Nevertheless, it is also contemplated in accordance with the present invention that the foam-impermeable layers or coatings 17 shown in FIG. 3 may be employed in the same manner in connection with the process illustrated in FIG. 3a, in which event the blocks 23 need not be coated with any adhesion-inhibiting substance since they will not be contacted by the poured foam.

Referring again to FIG. 3, it will be appreciated that a foam-impermeable coating 17 could just as well be disposed at the underside of each of the pleats 15 rather than above the latter as shown, inasmuch as its sole function is to prevent an accumulation of cured foam in and across the entire expanse of the respective channel defined beneath the pleat. To this end, the strips 17 of polyethylene or like material could be stapled or adhesively secured to the bottom face of the insulator sheet 12 at the regions of the pleats 15 thereof. It is possible, however, to accomplish substantially the same result without securing the strips 17 to the insulator. This is illustrated in FIG. 3b which shows the strips 17 simply draped over and suspended by the pleat apex-forming rods or wires 21. With this arrangement, of course, the possibility of some of the foam entering the spaces below the pleats does exist, but it will be apparent that the extent of the passage of foam through the pleats can be minimized somewhat by accelerating the curing operation, and that in any event the foam which has penetrated into the pleat channels cannot close the same since the downwardly hanging strips 17 effectively act as partitions preventing such a result.

A cushion construction of the type shown in FIG. 2, whether it be produced in the manner illustrated in FIGS. 3 or 3b or in the manner illustrated in FIG. 3a, is such that the spring system 11 is capable of acting, under an applied load such as a person sitting on the cushion, as would a "Marshall" arrangement of springs. Referring specifically to FIG. 2a, it can be seen that when such a load is applied to the seat cushion 10 through the foam rubber pad 13 thereof, as indicated by the vertical arrows, all the springs 11a in the immediate vicinity of the region of load application are compressed to a degree corresponding to the magnitude of the load, while those springs which are more or less remote from this region, e.g. the extreme right-hand and left-hand springs shown in FIG. 2a, are compressed correspondingly less or not at all but in no case are deflected out of their normal vertical positions. Thus, none of the springs spaced from the region of load application is pulled laterally over toward any of the springs which are subjected to the load, and as a corollary thereof all of the springs act independently of one another in supporting the pad 13 and the body of the person sitting thereon.

The foregoing will be readily understood from a consideration of the mechanics of the overall system, which reveals that, as the load is applied, the lower surface of the foam rubber pad 13 is arched downwardly and thereby stretched and elongated, while concurrently therewith the pleats in the insulator 12 are at least partly flattened out, regardless of whether they extend upwardly, as shown, or downwardly. In effect, therefore, the insulator 12 is permitted to "stretch" between the rows of springs even though it is made of a substantially inextensible material. Consequently, the regions of contact between the originally flat portions 16 of the insulator 12 and the top ends of the various rows of springs 11a remain in essentially the same respective vertical planes, although these regions of contact may be tilted relative to the vertical spring axes. As clearly shown in FIG. 2a, this is due to the fact that those springs which are at progressively greater distances from the region of load application will, if compressed at all, generally be somewhat more compressed at the sides thereof facing toward the said region of load application than on the sides facing away from that region. None of these springs is, however, deflected out of its normal vertical disposition.

A somewhat modified seat cushion construction is illustrated in FIG. 4. As there shown, the seat cushion 10' comprises a spring system 11 and a base sheet 14 of burlap, both identical in all respects to the corresponding elements of the construction illustrated in FIG. 2. Positioned across the top of the spring system 11 is an insulator 12' which, like the insulator 12 shown in FIG. 2, is composed of a sheet of burlap or like relatively open-mesh fabric. The insulator 12', however, is provided with a plurality of pleats 15' which extend downwardly therefrom and relative to the top plane of the spring system 11, so that the V-shaped channels defined by the respective pleats 15' open upwardly. The flat sections 16' of the insulator 12' are attached to the top end turns of the springs 11a and 11b in any suitable manner, as by means of suitable adhesives. Positioned over the insulator 12' is the foam rubber seating pad 13'. In accordance with this embodiment of the invention, the pad 13' is preformed in a suitable mold as a slab or sheet which is then transferred as a body onto the insulator 12' as shown in FIG. 4, where the requisite adhesion between the pad 13' and the insulator sheet 12' is effected through the intermediary of any suitable adhesives. It is apparent, therefore, that the preforming of the seating pad 13' before the same is placed onto the burlap insulator sheet 12' makes it impossible to have the pleats 15' of the latter extend upwardly relative to the plane of the insulator sheet as shown in FIG. 2, and necessitates that they extend downwardly from the insulator sheet as shown in FIG. 4.

The process of making the seat cushion shown in FIG. 4 thus differs primarily from those illustrated in FIGS. 3, 3a and 3b in that here no fluid foam is poured onto the insulator sheet 12'. Accordingly, no provision need be made for preventing any strike-through of foam in the region of the pleats 15', whereby no foam-impermeable coatings 17 are required. Moreover, the formation of the pleats 15' can be effected by simply permitting the sections of the sheet 12' disposed intermediate the rows of springs to drape downwardly into the gaps between the rows of springs. Means may, of course, be provided for ensuring that the pleats 15' are uniform in size and shape. Such means, by way of example, could comprise a plurality of rods or wires (not shown) between the rows of springs 11a—11b and at a predetermined level below the top plane of the spring system 11, so that the pleats would be formed by passing the sheet 12' under the said rods or wires when positioning it atop the springs 11a and 11b. Other means will readily suggest themselves to those skilled in the art.

The seating pad 13' is made of any suitable foam rubber, such as polyurethane foam, latex foam, vinyl foam or the like, in the same manner as explained hereinbefore in connection with the cushion construction of FIG. 2. Instead of being poured, molded and cured in situ, however, the foam material for the cushion according to this embodiment of the invention, as previously indicated, is formed into a sheet or slab of the desired size and shape in a separate mold (not shown), the so-formed slab or sheet then being placed onto the insulator sheet 12' and adhered thereto.

The manner in which the cushion of FIG. 4 acts under an applied load, e.g. a sitting person, is illustrated in FIG. 4a. In this case, as the lowermost surface of the pad 13' is arched downwardly, stretched and elongated, the pleats 15' in the burlap insulator sheet 12' tend to straighten out upwardly, thus again rendering the normally inextensible burlap sheet effectively extensible so as to permit the springs in the region of the load application to be compressed while permitting the remaining springs to be compressed to lesser extents or not at all, as previously described, without being deflected out of their normal vertical positions.

The end result of both the upward and the downward pleating of the insulator sheets 12 and 12', therefore, is the same, i.e., the "hammock effect" is substantially eliminated and the seat cushion is possessed of the advantages of the "Marshall" construction without being as costly to produce as would be a cushion having a true "Marshall" type spring arrangement. Moreover, cushions of the type according to the present invention give a high degree of localized deflection under load and thus provide optimum seating comfort.

Referring now to FIG. 5, it will be seen that the principles of the present invention are applicable to a mattress construction in substantially the same manner as to an automobile seat cushion. Thus, the mattress 24 comprises a pair of substantially rectangular, resilient seating pads 25 and 26 made of foam rubber and defining the opposite body-supporting faces of the mattress, an intermediate spring system 27 composed of an arrangement of hourglass springs 27a disposed vertically between the pads 25 and 26, and a pair of insulator sheets 28 and 29 interposed between the respective pads 25 and 26 and the adjacent ends of the springs 27a. Both insulators are pleated, as shown at 30 and 31, with the pleats extending parallel to one another between respective adjacent rows of springs 27a. It will be understood, of course, that in the mattress 24 the pleats extend from one end of the mattress to the other, i.e. longitudinally of the mattress, as distinguished from a seat cushion in which they extend from front to rear, i.e. transversely.

As clearly shown in FIG. 5, the pads 25 and 26 are preferably, except for contours, the same as the pad 13' shown in FIG. 4, i.e. they are preformed in a mold (not shown) from any suitable urethane, latex or vinyl foam prior to being secured to the insulator-faced spring system 27. To this end, the springs 27a are first positioned on a baseboard, such as shown at 18 in FIGS. 3, 3a and 3b, whereupon the insulator 28 is placed across the springs 27a. When the pleats 30 are disposed as shown, the flat sections 32 of the insulator 28 are adhesively secured to the spring ends on which they rest, and thereafter the pad 26 is placed onto the said flat insulator sections 32 and adhesively secured thereto. The so-formed assembly is then inverted, and the foregoing procedure is repeated with the insulator 29 and pad 26, until the latter is firmly secured to the flat sections 33 of the insulator 29. In the finished mattress, of course, when the pad 25 is uppermost and the pad 26 lowermost, the pleats 30 hang downwardly while the pleats 31 are collapsed, as shown in FIG. 5.

Although it is preferred that the seating pads 25 and 26 of the mattress 24 be preformed, i.e. molded and cured prior to the final assembly operations, it is to be understood that they could be formed by being poured and cured in situ in the same manner as the pad 13 shown in FIG. 2, with or without the presence of the foam-impermeable strips 17 as described in connection with FIGS. 3, 3a and 3b.

By virtue of its construction as aforesaid, the mattress 24 provides a high degree of resting comfort and is substantially free of the "hammock effect." As in the case of the seat cushions 10 and 10', the "extensibility" of the normally inextensible burlap insulators 28 and 29 ensures that the springs 27a respond to applied loads effectively independently of one another and in the same manner as would a more expensive, conventional "Marshall" type spring arrangement.

In all of the hereinbefore described embodiments of the present invention, the pleats in the insulator sheet or sheets extend in one direction only, i.e. from front to rear in a seat cushion for an automobile and from end to end in a mattress. It is, nevertheless, within the contemplation of the present invention that each insulator may be pleated in more than one direction if necessary or desired. This may best be understood by reference to FIG. 1. As there shown, the spring system 11 is composed of a plurality of springs arranged in two sets of perpendicular rows, one set extending from the front to the rear of the seat cushion 10, and the other set extending from one side of the cushion to the other. The spring system 27 of the mattress 24 has the same characteristic arrangement of its individual springs. In seat constructions embodying such spring systems, therefore, a bidirectional elimination of the "hammock effect" can be attained if the insulator is provided with two sets of perpendicularly intersecting, parallel pleats in a type of waffle-grid arrangement, with the pleats of one set being disposed between adjacent longitudinal rows of springs, and the pleats of the other set between adjacent transverse rows of springs. An insulator of this type would, of course, have to be preformed or shaped prior to the assembling operation, and thus would necessitate the use of a formable fabric, or a formable resin coated fabric such as a vinyl or rubber coated fabric, or a resin rubber blend, or an unsupported plastic film or sheet such as vinyl chloride film, or the like. The sole requirement to be observed in the choice of materials of which to make such a preformed, waffle-grid pleated insulator is that the latter must have sufficient strength to prevent the metal springs from pressing and cutting into the adjacent surface of the foam rubber seating pad. Such an insulator must also be sufficiently flexible not to interfere with the "Marshall" responses of the springs to applied loads, and must be porous if it is desired to pour the foam rubber onto the insulator for penetration therethrough so as to come into contact with and embed the adjacent spring ends.

By way of resume, therefore, the present invention in its broadest sense comprises the provision of a pleated insulator sheet between a resilient seating pad and a spring assembly which supports the same. The insulator sheet is made of any suitable normally relatively inextensible but flexible material, preferably burlap, and the pleats thus serve to render the sheet extensible in at least one direction transverse to the orientation of the pleats. The spring assembly is generally supported by a suitable base, which may be a rigid framework constituting a part of the actual seating structure, e.g. a chair or an automobile seat, or an unpleated sheet of a relatively inextensible fabric such as burlap, or a second pleated insulator sheet to the remote face of which is secured a second resilient seating pad. According to one particular aspect of the invention, where the seating pad is composed of foam rubber and is closed-molded, i. e. the foam is poured, molded and cured in situ on a spring-supported burlap or other fabric-type insulator sheet, the pleats extend upwardly relative to the plane of the sheet, out of registry with the springs, and may be coated with a foam-impermeable substance or otherwise treated to prevent passage of fluid foam into the interior spaces of the pleats below the sheet, while passage of fluid foam through the unpleated and spring-engaging portions of the sheet enables the uppermost spring ends to be securely bonded to the insulator sheet and to the seating pad. According to another aspect of the invention, where the seating pad is in the form of a preshaped slab or sheet of foam rubber or the like and is placed as a body onto the spring-supported insulator sheet, the pleats extend downwardly relative to the plane of the sheet, out of registry with the springs, and adhesives are employed to secure the pad, the springs and the unpleated portions of the insulator sheet to one another.

It is to be understood that the foregoing description of the present invention is for purposes of illustration only, and that the invention is susceptible to a number of variations and changes none of which involves any departure from the spirit and scope of the invention as defined in the appended claims.

Having thus described my invention, what I claim and desire to secure by Letters Patent is:

1. A seat construction, comprising a resilient seating pad, a plurality of coil springs arranged in spaced parallel rows, a normally inextensible, flexible insulator sheet having open interstices therein interposed between said pad and said coil springs, said insulator sheet being provided with a plurality of parallel pleats each of which is located between a respective pair of rows of said springs, said pleats being adapted to flatten out and thus to render said insulator sheet extensible under loads applied normally to said pad, whereby upon application of a load to said pad said springs are effectively independent of one another and those remote from the region of application of said load are not deflected laterally toward said region, said pad being formed from an elastomeric foam material with said material extending through said interstices in only the unpleated areas of the insulator sheet and surrounding the adjacent ends of said springs to securely bond the latter, said insulator sheet and said pad to one another.

2. A seat construction as defined in claim 1 wherein said seating pad is provided with a plurality of grooves in its bottom surface, and said pleats extend upwardly relative to the plane of said insulator sheet and are received, respectively, in said grooves.

3. A seat construction as defined in claim 1 wherein said insulator sheet has secured thereto in the area of said pleats respective coatings of a foam-impermeable substance to prevent strike-through of foam at said pleats.

4. A seat construction as defined in claim 3 wherein each of said coatings comprise a strip of polyethylene attached to the upper surface of a respective one of said pleats between the same and said seating pad.

5. A method of producing a seat construction comprising the steps of assembling a plurality of coil springs in upstanding relationship so that the uppermost ends of said springs are substantially coplanar with one another, positioning a normally inextensible, flexible insulator sheet having open interstices therein across said spring assembly, said insulator sheet being provided with a plurality of pleats each of which is located between a respective pair of said springs with the unpleated areas of said sheet engaging said uppermost ends of said springs, providing means at the location of said pleats for impeding the flow of fluid foam through said open interstices of said insulator sheet to thereby restrict the penetration of the fluid foam into the interior spaces of said pleats, pouring a fluid, elastomeric foam material on the upper surface of the insulator sheet to form a resilient seating pad, said fluid foam material passing through said interstices in only the unpleated areas of said insulator sheet and surrounding the uppermost ends of said springs, and thereafter curing said foam material in situ whereby the uppermost ends of said springs, said insulator sheet and said pad are securely bonded to one another, said pleats being capable of flattening out and thus rendering said insulator sheet extensible under loads applied normally to said pad, whereby upon application of a load to said pad said springs are effectively independent of one another and those remote from the region of application of said load are not deflected laterally toward said region.

6. The method as defined in claim 5 wherein said pleats are formed by folding those portions of said insulator sheet which are located between respective pairs of said springs upwardly relative to the plane of said sheet.

7. The method of producing a seat construction as defined in claim 5 wherein said means for impeding the flow of fluid foam comprise coatings of a foam-impermeable substance applied at the location of said pleats.

8. The method of producing a seat construction as defined in claim 7 wherein said coatings of foam-impermeable substance comprise strips of polyethylene positioned on the upper surfaces of said pleats.

9. A method of producing a seat construction comprising the steps of assembling a plurality of coil springs in vertical parallel relationship and in a plurality of parallel rows with the uppermost ends of said springs substantially coplanar with one-another, positioning a normally inextensible, flexible insulator sheet having open interstices therein across said spring assembly, said insulator sheet being provided with a plurality of substantially parallel pleats each of which is located between a respective pair of adjacent rows of said springs with the unpleated areas of said sheet engaging said uppermost ends of said springs, providing means at the location of said pleats for impeding the flow of fluid foam through said open interstices of said insulator sheet to thereby restrict the penetration of the fluid foam into the interior spaces of said pleats, pouring a fluid, elastomeric foam material on the upper surface of the insulator sheet to form a resilient seating pad, said fluid foam material passing through said interstices in only the unpleated areas of said insulator sheet and surrounding the uppermost ends of said springs, and thereafter curing said foam material in situ whereby the uppermost ends of said springs, said insulator sheet and said pad are securely bonded to one another, said pleats being capable of flattening out and thus rendering said insulator sheet extensible under loads applied normally to said pad, whereby upon application of a load to said pad said springs are effectively independent of one another and those remote from the region of application of said load are not deflected laterally toward said region.

References Cited in the file of this patent

UNITED STATES PATENTS

| Re. 24,914 | Koenigsberg | Dec. 20, 1960 |
| 2,779,036 | Platt | Jan. 29, 1957 |
| 2,954,076 | Crane et al. | Sept. 27, 1960 |

FOREIGN PATENTS

| 579,847 | Germany | July 1, 1933 |
| 629,771 | Great Britain | Sept. 28, 1949 |